United States Patent [19]
Marti

[11] Patent Number: 5,259,676
[45] Date of Patent: Nov. 9, 1993

[54] ROLLER BEARING SPINDLE AND HUB ASSEMBLY

[76] Inventor: Milford F. Marti, 4001 Devon St., Huntsville, Ala. 35802

[21] Appl. No.: 859,841

[22] Filed: Mar. 30, 1992

[51] Int. Cl.⁵ .............................................. F16C 19/18
[52] U.S. Cl. .................... 384/474; 384/540; 384/585
[58] Field of Search ............... 384/585, 589, 540, 474, 384/489

[56] References Cited
U.S. PATENT DOCUMENTS

| | | | |
|---|---|---|---|
| 1,437,833 | 12/1922 | Buckwalter | 384/589 |
| 3,901,568 | 8/1975 | Marti | 384/589 |
| 4,784,441 | 11/1988 | Welschof et al. | 384/589 |

Primary Examiner—Lenard A. Footland
Attorney, Agent, or Firm—Phillips & Beumer

[57] ABSTRACT

A method is provided for conversion of a permanently assembled ball bearing hub and spindle having ball bearing races constructed directly in the hub and spindle to a serviceable tapered roller bearing hub and spindle assembly. Additionally, the tapered bearing assembly of this invention is provided with grease passageways and a fitting so that the hub assembly may be lubricated with a grease gun without disassembly of the hub assembly.

6 Claims, 1 Drawing Sheet

ROLLER BEARING SPINDLE AND HUB ASSEMBLY

FIELD OF THE INVENTION

This invention relates generally to wheel hubs to which a road wheel for a vehicle is mounted and particularly to a method for converting a wheel hub having ball bearings to a wheel hub having roller bearings.

BACKGROUND OF THE INVENTION

A number of vehicle sin use today have road wheels with hub assemblies each constructed of a hub and spindle provided with a pair of antifriction bearings of the ball type. In many of these ball bearing hub assemblies, the hub is mounted to a frame or axle and is stationary, while the spindle is attached to the road wheel and rotates within the hub. In many of the light duty, compact, and subcompact automobiles manufactured today which are provided with front wheel drives, the rear wheels are provided with hub assemblies having ball antifriction bearings not provided with removable races, but instead constructed with a caged set of balls riding in permanent races machined directly into the hub and spindle. Additionally, many rental trailers are provided with this type of ball bearing hub. In this type of hub assembly, known as a unitized hub assembly, the entire hub and spindle, after being machined, is hardened to a hardness on the order of about Rockwell 72 in order to harden the ball races and extend their life. Additionally, these type hub assemblies are permanently assembled and are not provided with any means to be readily disassembled for servicing. Under normal operating conditions, these hub assemblies have a lifespan of about 100,000 miles, after which the grease installed at the manufacturing facility degrades or otherwise loses its antifriction properties or is lost due to a failed seal, the balls of the bearing and their permanent races wear at an accelerating rate, and soon reach a point where they are unserviceable. At this point, the entire hub assembly must be replaced, and since the bearing races cannot be refurbished, the worn hub assembly must be discarded. In one well-known rental trailer commonly in use today, this hub assembly costs about $285, not including labor costs, meaning that if it becomes necessary to replace more than a few of these hubs a year, thousands of dollars in hub maintenance costs a year may be accrued.

In accordance with the foregoing, it is an object of this invention to provide a method for converting permanently assembled and lubricated ball bearing hub assemblies to hub assemblies that may be readily disassembled for servicing.

It is a further object of this invention to convert such ball bearing hubs to tapered bearing hubs in order to extend service life of the hub assembly.

SUMMARY OF THE INVENTION

A ball bearing wheel hub of the prior art is disassembled to obtain a hub portion and a spindle portion with a shaft region, with the hub and shaft region each having ball bearing race regions thereon. The shaft region is machined to receive first and second inner races of first and second tapered roller bearings and threaded at a distal end to receive a threaded member. One end of the hub is machined to receive the first outer race of the first roller bearing and a grease seal, and the other end of the hub is machined to receive the second outer race of the second roller bearing and a grease cap. After the outer races are installed in each end of the hub, a bearing cone having a first inner race and caged rollers is installed in the first outer race, and the grease seal is installed to hold the cone in place. The shaft region of the spindle is then inserted through the grease seal and first inner race, and the second bearing cone is installed over the shaft region and seated in the second outer race. The threaded member is then threaded onto the threads of the shaft portion and end play of the spindle adjusted.

DESCRIPTION OF THE PREFERRED EMBODIMENT

Figure 1:
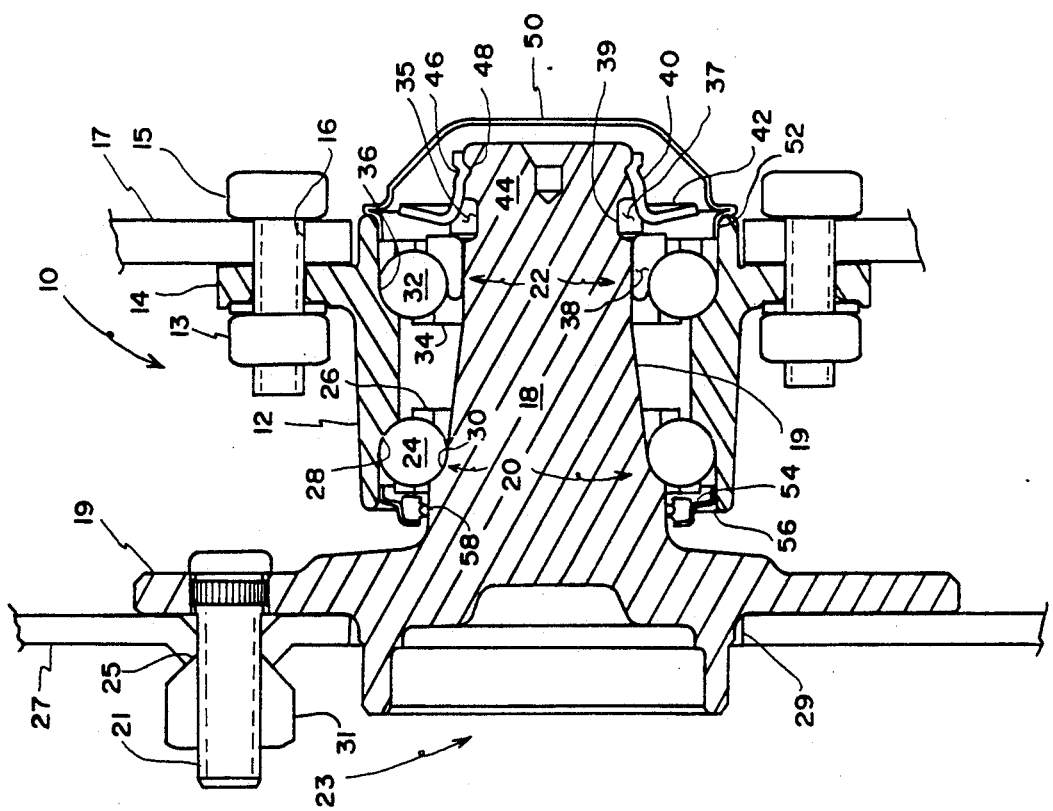
FIG. 1 is a plan view of a permanently assembled ball bearing hub assembly of the prior art.

Referring initially to FIG. 1, a permanently assembled, nonserviceable ball bearing hub assembly 10 of the prior art is shown. As illustrated, hub assembly 10 is constructed having a hub portion 12 with a flange 14 provided with openings 16 (only one being shown) for receiving fasteners, such as nut 13 and bolt 15, by which the hub assembly is fixed to an axle flange or frame member 17. A spindle 18 rotatably extends into hub 12 and is supported therein by outer and inner cup and cone-type ball bearing assemblies 20 and 22, respectively. Spindle 18 is provided with a flange 19 having a plurality of studs 21 (only one being shown) disposed to engage openings 25 (only one being shown) in an inner member or rim 27 of a road wheel, with lug nuts 31 securing rim 27 to flange 19. Additionally, a cylindrical region 23 on an outboard side of spindle 18 and concentric with shaft portion 19 of spindle 18 is disposed to engage a central opening 29 in rim 27. As such, spindle 18 rotates with the road wheel and rim, and hub 12 remains fixed.

Ball bearing 20 consists of load-bearing balls 24 separated by a cage 26, with balls 24 riding in a race 28 ground or machined in hub 12 and in a race 30 likewise ground or machined in spindle 18. Bearing 22 consists of load bearing balls 32 also separated by a cage 34, with balls 32 riding in a race 36 cut or machined in hub 12 and in a race insert 38 positioned about shaft portion 19. A pair of semicircular keys 35 and 37 are set in a groove 39 proximate end 44 of shaft portion 19 and serve as retainers for race 38. Due to the tapered configuration of shaft portion 19 and the curved configuration of the races of bearings 20 and 22, race insert 38 is held onto shaft portion 19 so as to permanently adjust preload of ball bearings 20 and 22 during manufacture. As such, there are no adjustments that can be made to the bearings of the hub, and if misadjusted, can result in premature bearing failure. An annular collar 40 having a flange 42 for holding keys 35 and 37 in place is mounted to end 44 of spindle 18 and is permanently crimped into place by a crimped region 46 engaging a groove 48 proximate end 44 of shaft region 19. With collar 40 crimped in place as described, disassembly of the hub for servicing is precluded, as the spindle cannot be removed from the hub without destroying collar 40 in the process of prising it loose from groove 48, nor may it be conveniently replaced with tools commonly found in an automotive repair facility. A grease cap or dust cover 50 adjacent to bearing 22 encloses end 44 of shaft portion 19, engaging opening 52 of hub 12, and prevents lubricating grease inside the hub from escaping. Likewise, a grease seal 54 mounted in opening 56 of hub 12 and adjacent bearing 20 rotatably bears against a smoothed region 58 of spindle 18, forming a rotating grease seal between smoothed region 58 of the spindle and seal 54. Premature failure of seal 54 will allow lubricating grease to escape and moisture and other contaminants to enter the hub, resulting in ruination of the hub assembly. Worse yet, even if failure of the seal is detected, the hub assembly cannot be readily disassembled to replace the seal and grease because of the aforementioned crimped manner of affixing annular collar 40 to the end of shaft portion 19.

Figure 2:
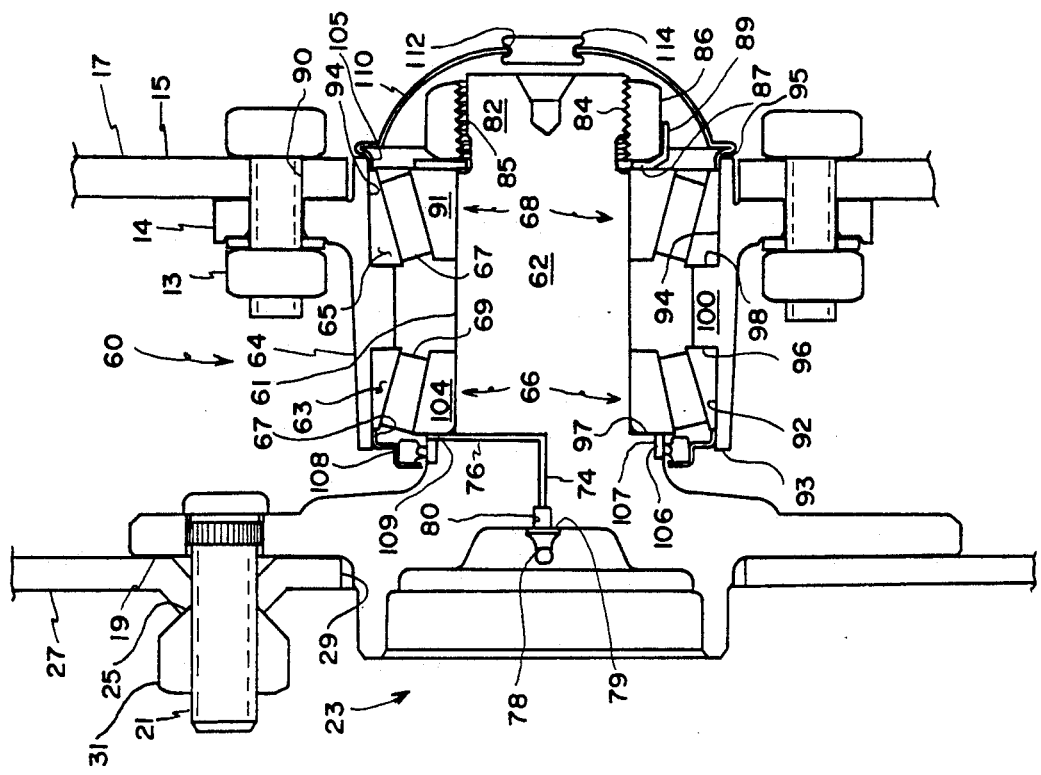
FIG. 2 is a plan view of a hub assembly converted from the hub of FIG. 1 to a serviceable, tapered roller bearing hub.

Referring now to FIG. 2, a hub assembly 60 of the type shown in FIG. 1 has been retrofitted with tapered roller bearings and grease passageways and a grease fitting for providing lubrication to the bearings. Here, a spindle 62 having a shaft portion 61 is rotatably supported in a hub 64 by outboard and inboard tapered roller bearing assemblies 66 and 68, respectively. As with spindle 18, spindle 62 is provided with a flange 19 having a plurality of studs 21 (only one shown) adapted for engaging openings 25 in a rim 27 of a road wheel. Likewise, central region 23 engages an opening 29 in rim 27.

For lubricating the hub assembly, spindle 62 is provided with a longitudinal bore 74 beginning at an outboard, central point of central region 23 and extending inward along an axis of shaft portion 61 to a point generally transverse with outboard bearing 66. A generally transverse bore 76 communicating with bore 74 extends outward to a point between the grease seal and outer bearing 66 for providing grease to the bearings and interior regions of the hub. A grease fitting 78 is press fitted, or alternately threaded, into an opening 80 communicating with bore 74. Constructed as such, grease may be provided to bearings 66 and 68 via bores 74 and 76 by a conventional grease gun (not shown) conveniently attachable to grease fitting 78 from the outboard side of the spindle. At an opposite end 82 of shaft portion 61, threads 84 having a flattened, tangential region 85 are provided for receiving a nut 86 and a D-washer 87, with the straight, inner region of the D-washer engaging flat region 85, rotatably locking the washer to the shaft. Further, the D-washer is provided with outwardly extending locking fingers or tabs 89, which washer in turn bears against spindle race 91 of inboard bearing 68. Nut 86 is tightened to adjust end play of the spindle in bearings 66 and 68 from about 0.001" to about 0.002", holding the hub assembly together, and is rotatably locked in place by at least one of the locking tabs 89 of washer 87, which is bent to engage nut 86 after the end play adjustment is performed.

Hub 64 is also provided with flange 14 having openings 90 disposed to be fitted to fasteners for fixedly mounting the hub to a frame or axle (not shown), allowing spindle 62 to rotate with the road wheel. Outboard and inboard hub races 63 and 65, respectively, of bearings 66 and 68 are fitted in openings 92 and 94 of hub 64 and abutted against shoulders 96 and 98 of a circular ridge 100 extending around a central interior region of hub 64. Inner spindle races 91 and 104 are a slip fit with shaft portion 61, which is machined as a straight shaft. An annular collar 106 constructed of a harder material than spindle 62, such as stainless steel, is fixed, as by an interference fit, on a recess 107 of a larger diameter than shaft portion 61 and outboard outer bearing 66, and provides a hard, smooth wear surface for grease seal 108, which is fitted in opening 92 of hub 64. Alternately, shaft 62 may be machined closer to flange 27 and collar 106 constructed of thicker dimension so as to provide both face 97 and the Wear surface for the grease seal. A semicircular grease passageway 109 is milled in collar 106 and the face of recess 107 and communicates with transverse passageway 76. A grease cap 110 having an opening 112 and provided with a removable plug 114 is fitted into opening 94 of hub 64 and prevents lubricating grease for the bearings from escaping.

For converting the spindle of a wheel hub assembly from the permanently assembled ball bearing type as described above to a tapered roller bearing type, which conversion generally, but not necessarily, is performed after the roller bearing and permanent races have become unserviceable or at scheduled maintenance. Initially, and referring to FIG. 1, grease cap 50 is removed and discarded. Studs 21 are pressed out and retained to be reinstalled. The spindle 18 is then chucked in a lathe by cylindrical region 23, and crimped region 46 of annular collar 40 is turned and cut such that collar 40 and keys 35 and 37 may be removed. After removing collar 40 and keys 35 and 37, hub assembly 10 is disassembled by removing the hub from the spindle and removing bearing assemblies 20 and 22, grease seal 54, and race 38. The hub and spindle are cleaned and annealed in a furnace to about 2,200 ™ F. in order to reduce hardness of the spindle and hub so they may be machined. After cooling, the spindle is rechucked in a lathe by cylindrical region 23 and the shaft portion of the spindle turned and ground to a straight shaft region 61, as shown by spindle 62 in FIG. 2, and having a diameter, in the instance of the aforementioned trailer hubs, of about 1.250". End 44 (FIG. 1) of shaft region 61 is then threaded to provide threads 84 disposed to receive a locking nut. A larger diameter region 107 is machined adjacent to flange 19 for receiving a hardened collar 106, in this example, to a diameter of about 1.750. Collar 106 is then heated to expand its diameter so that it may be fitted over diameter 107 and shrinks to an interference fit with diameter 107 as collar 106 cools. Passageway 74 is then drilled generally along an axis of spindle 62 and extends from a central point in cylindrical region 23 to a point perpendicular with or just beyond outboard bearing 66. An opening 80 axially aligned with passageway 74 is drilled to receive grease fitting 78, and a flat region 79 about opening 80 is provided for a flange on grease fitting 78 to seat against. A flat, tangential region 85 is ground on threads 84 for receiving a straight, inner region of D-washer 87. A semicircular grease passageway 109 is milled in the face of recess 107 and collar 106 down to the diameter of the shaft portion of spindle 62, and passageway 76 is drilled from where milled passageway 111 ends such that milled passageway and drilled passageway 76 both communicate with passageway 74. These passageways are then cleared with compressed air, and grease fitting 78 is pressed into place. Lastly, studs 21 that were initially removed and which engage the road wheel are then reinserted into their respective openings.

For converting the hub 12 (FIG. 1) of a wheel hub assembly from a ball bearing-type hub to a roller bearing-type hub, and after initial disassembly, cleaning and annealing as described above, the hub is chucked by an exterior region adjacent t9 inner bearing races 22 in a chuck and rotated to determine trueness. The inner and outer edges 93 and 95 (FIG. 2) are faced, or ground flat and parallel with each other, such that the hub is a selected length, in this example, 2.350".

Next, inboard opening 52 and inboard ball bearing race 36 are bored to a diameter to receive inboard tapered race 65 of inboard tapered roller bearing 68, in this instance, 2.438" and to a depth to recess race 65 in hub 64 for providing a region to receive lip portion 105 of grease cup 110. The hub 12 is then reversed and rechucked by engaging the newly cut bore with an interior chuck and outboard opening 56 and outboard roller bearing race 28 (FIG. 1) bored to a diameter to receive outboard tapered race 63, (FIG. 2) or 2.438", and to a depth to receive race 63 and lip 67 of grease seal 108.

As a result of these boring operations, the hub 12 is provided with an inboard opening 94 and an outboard opening 92 and a central, interior ridge 100 which provides opposed shoulders 96 and 98 against which races 63 and 65 are respectively abutted. Races 63 and 65 are then installed in openings 92 and 94, respectively. Caged roller bearing members 69 and associated race 104 are placed in race 63, and grease seal 108 is installed in opening 92 to hold bearing members 69 and race 104 in place. Hub 64 is then placed over spindle 62, with the flexible seal portion of seal 108 bearing against the outer wear surface of collar 106, and the outer shoulder of race 104 bearing against face 97 of enlarged region 107 of spindle 62. Race 91 and the caged roller bearing members 67 are then placed over spindle 62, after which D-washer 87 is placed over spindle 62 and against race 91. Nut 86 is screwed onto threaded portion 84 of spindle 62 and tightened against race 91 to adjust end play of the spindle in the hub to between 0.001" to 0.002". After this adjustment is made, one or more of locking tabs 89 is bent to engage a flat of nut 86, locking nut 86 in place. Grease cap 110 is then installed, and plastic plug 114 is removed.

A conventional grease gun (not shown) is then attached to grease fitting 78, and grease is pumped through passageways 74 and 76 to a point between seal 108 and race 104. The grease spreads throughout this region and passes through bearing 66 to the inner region between bearings 66 and 68. After this inner region is filled, grease passes through bearing 68 and appears in opening 112. At this point, the hub and bearings are packed with grease. Cap 114 is replaced, and the hub and spindle assembly is painted prior to installation. Alternately, the roller bearings may be conventionally packed by hand prior to assembly of the spindle and hub and the hub conventionally filled with grease by hand. In this case, passageways 74 and 76 may be omitted and the hub assembly serviced in a conventional manner. Otherwise, when a regular service interval for lubricating the hub assembly occurs, cap 114 is removed, a grease gun is applied to grease fitting 78, and fresh grease is pumped through the hub assembly and bearings as described, displacing spent lubricant through opening 112. End play and preload of the roller bearings would be adjusted as required by bending tabs 89 of D-washer 87 so that nut 86 may be tightened against race 91 to adjust end play as described.

Having thus described my retrofit process for converting a ball bearing wheel hub to a tapered bearing hub with respect to usage with trailers, it will be apparent to those skilled in the art that this retrofit process is applicable to all such wheel hubs having ball bearings. Further, incidental changes may be made to my invention and its process of manufacture while not departing from the scope of the invention, wherein I claim:

I claim:

1. A roller bearing spindle and hub assembly comprising:

a spindle provided with a flange securable to a road wheel of a vehicle and including a shaft portion extending outward from said flange, said shaft portion having a threaded region at a distal end thereof, and an enlarged region of said shaft adjacent to said flange defining a shoulder;

an annular hub member secured to said vehicle and having first ad second aligned openings;

first and second tapered roller bearings each having an inner and an outer race, said inner race of each said first and second roller bearings slidably engaging said shaft portion of said spindle, with said inner race of said first roller bearing abutted against said shoulder and said outer race of said first and second bearings secured in said first and second openings of said hub, respectively;

a threaded member threaded to said threaded end of said shaft and providing bias against a side of said inner race of said second roller bearing, rotatably securing said spindle in said hub;

a grease seal secured in said first opening and positioned outboard said shoulder and having at least one sealing surface rotatably bearing on a smooth surface outboard of said shoulder;

at least one lubrication passageway extending through said spindle to a region between said grease seal and said first inner race, for conveying lubrication from an outboard region of said spindle to said region between said grease seal and said first inner race; and a grease cap secured in said second opening adjacent to said threaded end of said shaft;

whereby said spindle and hub assembly may be disassembled for servicing by removal of said threaded member, and wherein end play of said spindle in said hub is adjustable by rotating said threaded member.

2. A roller bearing and hub assembly as set forth in claim 1 wherein said grease cap is provided with a sealable opening for allowing spent lubrication to be ejected from said hub assembly as said lubrication fills said first and second tapered roller bearings.

3. A roller bearing spindle and hub assembly comprising:

a spindle provided with a flange securable to a road wheel of a vehicle and including a shaft portion extending outward from said flange and having a threaded region at a distal end thereof and an enlarged region about said shaft adjacent to said flange and defining a shoulder;

an annular collar of a hardened material about said enlarged region and provided with an outer wear surface;

an annular hub member secured to said vehicle and having first and second aligned openings;

first and second tapered roller bearings each having an inner and outer race, said inner race of each said first and second roller bearings slidably engaging said shaft portion of said spindle, with said inner race of said first roller bearing abutted against said shoulder and said outer race of said first and second bearings secured in said first and second openings of said hub, respectively;

a threaded member threaded to said threaded end of said shaft and bearing against a side of said inner race of said second roller bearing, rotatably securing said spindle in said hub;

a D-washer having at least one bendable tab disposed for being bent into engagement with said threaded member, securing said threaded member in place;

a grease seal secured in said first opening and disposed to rotatably bear against said outer wear surface of said collar;

a lubrication passageway extending from an outboard point of said spindle to a point between said grease seal and said first inner race, for conveying lubrication from said outboard point of said spindle to said point between said grease seal and said first inner race, filling said spindle and hub assembly with lubrication; and a grease cap secured in said second opening adjacent said threaded end of said shaft;

whereby said spindle and said hub assembly may be disassembled for servicing by removal of said threaded member, and wherein end play of said spindle in said hub is adjustable by rotating said threaded member, and lubrication may be provided via said grease passageway from said outboard point of said spindle to interior regions of said hub.

4. A roller bearing spindle and hub assembly comprising:

a spindle provided with a flange securable to a roadwheel of a vehicle and including a shaft portion extending outward from said flange, said shaft portion having a threaded region at a distal end thereof, and an enlarged region of said shaft adjacent to said flange defining a shoulder;

an annular hub member secured to said vehicle and having first and second aligned openings;

first and second tapered roller bearings each having an inner and outer race, said inner race of each said first and second roller bearings slidably engaging said shaft portion of said spindle, with said inner race of said first roller bearing abutted against said shoulder and said outer race of said first and second bearings secured in said first and second openings of said hub, respectfully;

a threaded member threaded to said threaded end of said shaft and providing bias against a side of said inner race of said second roller bearing, rotatably securing said spindle in said hub;

a grease seal secured in said first opening and positioned outboard said shoulder and having at least one sealing surface rotatably bearing on a smooth surface outboard of said shoulder;

a lubrication passageway extending through said spindle and communicating from an exterior region of said spindle to an interior region of said hub; and a grease cap secured in said second opening adjacent to said threaded end of said shaft, said grease cap provided with a sealable opening for allowing spent lubrication to be ejected from said hub assembly;

whereby said spindle and hub assembly may be disassembled for servicing by removal of said threaded member, and wherein end play of said spindle in said hub is adjustable by rotating said threaded member.

5. A roller bearing spindle and hub assembly comprising:

a spindle provided with a flange securable to a roadwheel of a vehicle and including a shaft portion extending outward from said flange, said shaft portion having a threaded region at a distal end thereof, and an enlarged region of said shaft adjacent to said flange defining a shoulder;

an annular hub member secured to said vehicle and having first and second aligned openings;

first and second tapered roller bearings each having an inner and outer race, said inner race of each said first and second roller bearings slidably engaging said shaft portion of said spindle, with said inner race of said first roller bearing abutted against said shoulder and said outer race of said first and second bearings secured in said first and second openings of said hub, respectively;

a threaded member threaded to said threaded end of said shaft and providing bias against a side of said inner race of said second roller bearing, rotatably securing said spindle in said hub;

a grease seal secured in said first opening and positioned outboard said shoulder and having at least one sealing surface thereon;

an annular collar of a hardened material positioned outboard said shoulder and having a smooth outer surface for rotatably engaging said sealing surface of said grease seal; and a grease cap secured in said second opening adjacent to said threaded end of said shaft;

whereby said spindle and hub assembly may be disassembled for servicing by removal of said threaded member, and wherein end play of said spindle in said hub is adjustable by rotating said threaded member.

6. A roller bearing spindle and hub assembly comprising:

a spindle provided with a flange securable to a roadwheel of a vehicle and including a shaft portion extending outward from said flange, said shaft portion having a threaded region at a distal end thereof, and an enlarged region of said shaft adjacent to said flange defining a shoulder;

an annular hub member secured to said vehicle and having first and second aligned openings;

first and second tapered roller bearings each having an inner and outer race, said inner race of each said first and second roller bearings slidably engaging said shaft portion of said spindle, with said inner race of said first roller bearing abutted against said shoulder and said outer race of said first and second bearings secured in said first and second openings of said hub, respectively;

a threaded member threaded to said threaded end of said shaft and providing bias against a side of said inner race of said second roller bearing, rotatably securing said spindle in said hub;

a washer having at least one bendable tab for engagement with said threaded member, rotatably locking said threaded member in place;

a grease seal secured in said first opening and positioned outboard said shoulder and having at least one sealing surface rotatably bearing on a smooth surface outboard said shoulder; and a grease cap secured in said second opening adjacent to said threaded end of said shaft;

whereby said spindle and hub assembly may be disassembled for servicing by removal of said threaded member, and wherein end play of said spindle in said hub is adjustable by rotating said threaded member.

* * * * *